United States Patent
Tolley et al.

(10) Patent No.: US 6,349,865 B1
(45) Date of Patent: Feb. 26, 2002

(54) COLLAPSIBLE STORAGE COMPARTMENT WITH UNIVERSAL ATTACHMENT SYSTEM FOR TRUCKS OF ALL SIZES

(75) Inventors: Alan Tolley, Belmont, NC (US); Michael Hooper, Coronado, CA (US); Blake Leary; Hong Xu, both of Charlotte, NC (US)

(73) Assignee: Tibs Corporation, Belmont, NC (US)

( * ) Notice: Subject to any disclaimer, the term of this patent is extended or adjusted under 35 U.S.C. 154(b) by 0 days.

(21) Appl. No.: 09/516,411

(22) Filed: Mar. 1, 2000

Related U.S. Application Data

(63) Continuation of application No. 09/089,905, filed on Jun. 3, 1998, now Pat. No. 6,070,775.

(51) Int. Cl.[7] .................................................. B60R 9/00
(52) U.S. Cl. ........................ 224/404; 224/539; 224/543; 224/572; 296/37.6
(58) Field of Search ................................. 224/402, 403, 224/404, 405, 539, 543, 572; 383/22, 23, 24, 61; 296/37.6, 37.5

(56) References Cited

U.S. PATENT DOCUMENTS

| | | |
|---|---|---|
| 639,429 A | 12/1899 | Nutter |
| 1,656,339 A | 1/1928 | Runyan |
| 5,326,175 A | 7/1994 | Carter |
| 5,366,124 A | 11/1994 | Dearborn, IV |
| 5,605,112 A * | 2/1997 | Schuman ................. 224/572 X |
| 5,620,124 A | 4/1997 | Geier |
| 5,628,442 A | 5/1997 | Wayne |
| 5,738,262 A | 4/1998 | Andrini |
| 5,868,294 A | 2/1999 | Webster |
| 5,873,456 A | 2/1999 | Hull et al. |
| 6,070,775 A * | 2/2000 | Tolley et al. ................ 224/404 |

FOREIGN PATENT DOCUMENTS

| | | |
|---|---|---|
| GB | 455192 | 10/1936 |
| NO | 58618 | 11/1997 |
| WO | 94015496 | 7/1994 |

* cited by examiner

*Primary Examiner*—Gregory M. Vidovich
(74) *Attorney, Agent, or Firm*—Streets & Steele; Jeffrey L. Streets

(57) ABSTRACT

The present invention provides a device for storing or securing objects in a truck bed. The device comprises a collapsible compartment and two or more straps, each strap comprising a first end attached to the compartment and a second end having a fastener affixed to the second end for securing the second end to a rigid component of the truck, such as the truck frame. The storage compartment and system secures objects from sliding around the bed and protects the objects from damage during transport or inclement weather. The device may be installed without invasive modification of the truck bed, conserves cargo hauling capacity of the truck by including a compartment that is collapsible, and, optionally, provides tie downs for securing oversized objects in the truck bed.

6 Claims, 9 Drawing Sheets

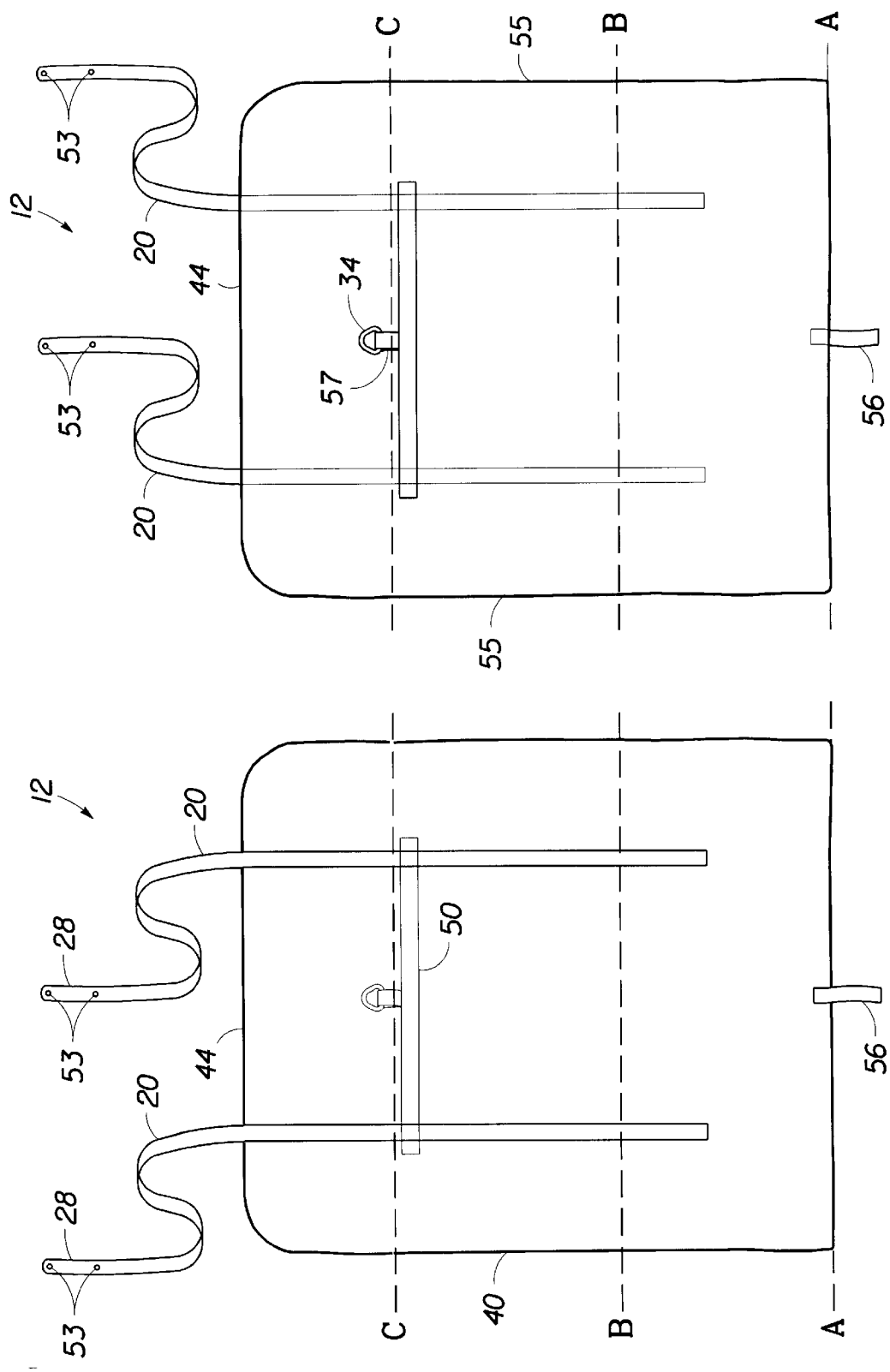

COLLAPSIBLE STORAGE COMPARTMENT WITH UNIVERSAL ATTACHMENT SYSTEM FOR TRUCKS OF ALL SIZES

This is a continuation of application Ser. No. 09/089,905 filed on Jun. 3, 1998, now U.S. Pat. No. 6,070,775.

BACKGROUND OF THE INVENTION

1. Field of the Invention

This invention relates to storage compartments for truck beds and methods of securing objects in truck bed. More particularly, the invention relates to systems for attaching and stowing storage compartments in truck beds.

2. Background of the Related Art

Light duty trucks have long been used to transport objects of various sizes from one place to another. The truck bed is easily accessible to placement of cargo and is sufficiently large to accommodate a large number of articles, even articles having odd or irregular shapes. However, movement of the truck can cause the article or cargo to shift, slide, tip over or fall out. These actions can cause damage to the truck (such as a scratched or dented truck bed), damage to the article, or road hazards.

There have been many devices designed to address these problems using tools, fasteners, or other devices. These devices assist the truck owner to safely transport articles in the pickup truck. These devices include toolboxes, tie down inserts, bed mats, tarps, anchor straps, bungie cords and the like. However, while solving certain of the problems described above, each of these accessories have limitations of their own.

For example, while truck toolboxes may be successfully used to prevent articles, such as small tools, from moving about the truck bed, they typically require the truck owner to permanently forfeit over 20,000 cubic inches of bed space. Furthermore, the size of the article to be contained in the toolbox is limited by the size of the access door as well as the internal dimensions of the box. Because these boxes are typically rigid, odd shaped objects may often need to be secured outside the box. Installation of the box requires tapping or drilling anchor bracket holes into the truck's supporting body parts, permanently altering the structure of the truck bed. Holes through the truck bed may be difficult to make without damaging other portions of the truck and any removal of protective coatings accelerates corrosion to the underlying metal. Additionally, the truck bed walls are typically made of sheet metal that is not designed to be a load-bearing member.

Tie down inserts are designed to provide anchors along the truck bed side walls to which loads can be secured. These inserts fit into the existing side wall structure of the truck bed and are most useful for securing oversized objects. However, tie downs alone do not provide protection of the cargo from environmental conditions, such as rain, ultraviolet rays, dust, dirt, wind, and the like. Typically, the tie downs can only be affixed to the side walls in pre-formed locations determined by the truck manufacturer. These tie downs could be placed in four or six symmetrical locations depending on the make and model of the truck. Frequently, these locations are not convenient or ideal for securing a particular object in the preferred transport location, typically the front and center of the truck bed.

Truck bed liners have become commonplace to protect the integrity of the truck bed from scratches, dents and other damage that typically decreases the life of the bed. Liners are available in a number of different forms, such as bed inserts, rubber mats, spray coatings and the like. The most common liners are bed inserts, typically made from a hard plastic or polymeric material, that are available as standard dealer options or as after-market accessories. While these liners have proven effective at protecting the truck bed, the smooth plastic surfaces do not prevent objects from sliding around during transport.

Therefore, there is a need for a storage compartment and system for use in truck beds that secures objects from sliding around the bed and protects the objects from damage during transport or inclement weather. There is also a need for a storage compartment that does not require invasive modification of the truck bed in order to install the compartment. It would be desirable if the compartment were collapsible in order to conserve cargo hauling capacity of the truck bed. It would also be desirable if the system provided tie downs for securing oversized objects in the truck bed.

SUMMARY OF THE INVENTION

The present invention provides a device for storing or securing objects within a truck bed. The device comprises a collapsible compartment and two or more straps, each strap comprising a first end attached to the compartment and a second end having a fastener affixed to the second end for securing the second end to a rigid component of the truck, such as the truck frame. The storage compartment and system secures objects from sliding around the bed and protects the objects from damage during transport or inclement weather. The device may be installed without invasive modification of the truck bed, conserves cargo hauling capacity of the truck by including a compartment that is collapsible, and, optionally, provides tie downs for securing oversized objects in the truck bed. Further, the device is located along the front wall of the truck bed, providing the truck owner with the ability of securing the load as far forward as possible and distributing the load to the truck's frame.

One aspect of the invention provides an anchor system and method for universal attachment or coupling of the collapsible compartment to a truck. The anchor system may comprise straps, cables, ropes or other strong and flexible members or materials having a first end secured or attached to the collapsible compartment and a second end capable of being secured or attached to a rigid member of the truck. A particularly preferred anchor system is made from a durable and substantially weather-proof and wear-resistant material, such as heavy nylon straps. The first end of the anchor straps may be secured or attached to the collapsible compartment in any conventional manner, including permanently affixed designs (such as by sewing, riveting and the like) or detachable designs (such as clasps, hooks, loops, bolts and the like). The second end of the anchor system may be secured or attached to a rigid member of the truck in any conventional manner, including eyelets and bolts, clasps, latches and the like. The rigid member of the truck is preferably the truck frame below the truck bed, but may also include any other member of the truck capable of maintaining its integrity under anticipated loads and forces.

While the anchor system of the present invention may be designed specifically for individual makes and models of trucks, it is preferred that the anchor system provide a universal connection to all makes and models of trucks. The universality of the system is preferably established by providing the anchor system with sufficient length between the first and second ends to extend from the collapsible compartment over the front wall of the truck, between the truck bed and cab, and down to the truck frame or other rigid member. Since the length of this path will vary between makes and models, the anchor system should provide for the effective length of the connecting member, i.e., the length from the rigid member to the collapsible compartment, to be adjustable. Adjustment of the effective length of the anchor system may be accomplished by providing a plurality of fasteners spaced along the second end so that the fastener at the location appropriate for a given make and model truck may be used for installation or by providing a mechanism for taking up slack between the first and second ends of the connecting member. Such a mechanism for taking up slack may include clasps, buckles and the like. A particularly preferred buckle is described below as a "D" ring.

Another aspect of the invention provides a tie down member, such as a ring, hook, post or other member, for "tying down" objects to be hauled in the truck bed, such as with ropes or bungie cords, so that the objects will not slide around within the truck bed during transport. While the tie down member may be detachably attached or permanently affixed to any portion of the connecting member or the collapsible compartment, the tie down member is preferably located near the first end of the strap so that forces acting on the object are directly transferred to the truck frame and any shifting of the object is minimized. Even more preferably, the tied down member is formed integrally with a buckle for taking up slack in the connecting member. The tie down is preferably permanently fixed to the connecting member.

Yet another aspect of the invention provides a collapsible compartment for receiving objects to be stored or hauled in the truck bed. The collapsible compartment is attached to the first ends of each anchor system, preferably at points adjacent the top of the compartment and spaced apart the approximately the same distance as the average spacing of truck bed frames or other suitable rigid members. Furthermore, the collapsible compartment is preferably made from a flexible sheet or material that is durable and substantially weather-proof, wear-resistant or tearresistant, such as heavy neoprene fabric. While the collapsible compartment may be constructed with straight walls, the compartment preferably includes expandable walls, i.e., top, bottom or sides, to increase the storage capacity of the compartment, and may contain subcompartments. Expandable walls may include pleats, gathers of material or the like.

The flexibility/comformability of the material, whether or not the walls are straight or expandable, allows the compartment to wrap around objects of regular or irregular shapes having one or more dimension greater than could be received in a rigid compartment of similar capacity. For example, a rigid rectangular compartment having a given width, length and height may have insufficient width to receive a kitchen chair due to the width of the seat or legs yet the same rigid compartment have more than enough length to accommodate the chair. By contrast, any excess material along the length of the flexible compartment can be pulled around the chair to fully receive the chair therein. It should be noted that the word "flexible" as used herein should not be taken to require stretching or elongation of the material, but rather a comformability to the contours of an object in contact therewith.

The collapsible compartment, such as an envelope, preferably provides a door, cover or flap that may be opened to allow placement of objects within the compartment and securely closed to contain the object. While not required, the door, cover or flap may be sufficiently oversized to shed rain water or dust from entering the compartment.

Additionally, the collapsible compartment requires virtually no truck bed forfeiture while providing a large storage capacity. Objects forced against the compartment will cause the compartment to compress and the compartment can be rolled up, like a sleeping bag, and fastened to the front wall of the truck bed. This feature allows use of the full truck bed removing or disconnecting the device.

Yet another aspect of the invention provides a support bar or hanger that reinforces the connecting members or straps and allows the compartment to hang uniformly therefrom. The support bar preferably extends across the width of the compartment or at least a major portion of the front wall of the truck bed and preferably is positioned adjacent the top edge of the compartment where the anchor system attaches to the compartment. The support bar prevents the compartment from drooping and decreases the effort required to hold the compartment open for placement of an object.

A further aspect of the invention provides a retaining strap or cord for retaining the collapsible compartment in a rolled or folded position when the device is not in use. Preferably the strap has a first end attached to the compartment and a second end securable to a buckle, clasp or other type of fastener. Preferably, the fastener is also secured to the compartment, most preferably as a portion of an integral buckle and tie down member.

It should be appreciated that the apparatus and methods of the present invention require no drilling into the truck and no use of adhesives. Therefore, the apparatus does not jeopardize the integrity or appearance of the truck.

Additionally, the invention may comprise weights located variously on or in the compartment to prevent the compartment from flapping around in the wind or falling over the front wall and between the wall and cab. While such weights are optional, they are preferably provided on the wall of the compartment in contact with the front wall of the truck, since this will maintain tension on the anchor system. The weights may be provided as one or more dedicated weights, perhaps disposed into pockets along the length of the compartment, or as a heavy support bar as described above.

BRIEF DESCRIPTION OF THE DRAWINGS

So that the manner in which the above recited features and advantages of the present invention can be understood in detail, a more particular description of the invention, briefly summarized above, may be had by reference to the embodiments thereof which are illustrated in the appended drawings. It is to be noted, however, that the appended drawings illustrate only typical embodiments of this invention and are not to be considered limiting of its scope, for the invention may admit to other equally effective embodiments.

FIGS. 4(A–B) are face views, respectively, of a pattern for constructing a compartment with two straps in accordance with the invention.

DETAILED DESCRIPTION OF THE PREFERRED EMBODIMENT

Figure 1:
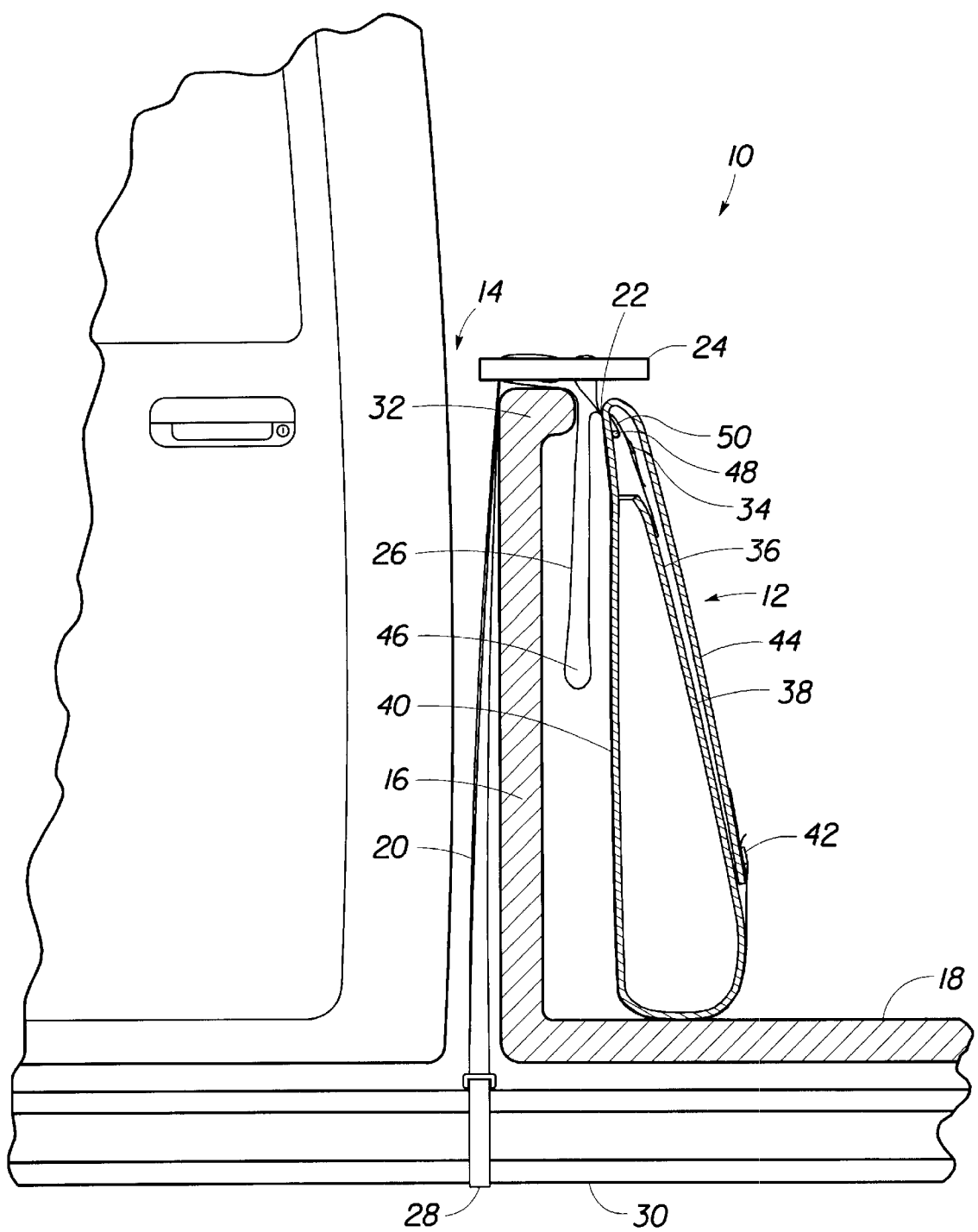
FIG. 1 is a cross-sectional side view of the compartment and strap system installed in a bed of a truck.

FIG. 1 is a cross-sectional side view of a storage device 10 of the present invention having a compartment 12 and anchor system 14 installed along the front wall 16 of a truck bed 18. The anchor system 14 comprises straps 20 firmly attached, preferably by heavy stitching, to the compartment 12 at a position near the top edge 22. A buckle 24 is used to take up slack in the strap 20 between a first end 26 attached at the top edge 22 and a second end 28 coupled to a rigid member of the truck, such as the truck frame 30. It is preferred that sufficient slack be removed from the strap 20 so that the top edge 22 of the compartment 12 will hang just below the top edge 32 of the front wall 16 of the truck bed. Even more preferably, the strap 20 is provided with sufficient length to leave a loop 46 hanging freely behind the compartment 12.

The compartment 12 is closed by a first buckle 34 which secures the top edge 36 of the compartment's front wall 38 to a point near the top edge 22 of the back wall 40. A second buckle 42, or preferably a pair of buckles 42, are used to secure the flap 44 in a downward position to close the compartment 12. A rigid support bar 48, preferably a heavy metal bar, is disposed in a pocket 50 and extends across at least a major portion of the compartment 12 to act as a hanger for the fabric compartment. Not only does the support bar make the device more attractive, but it also prevents drooping of the compartment which can lead to accelerated wear and tear on the material.

Figure 2A:
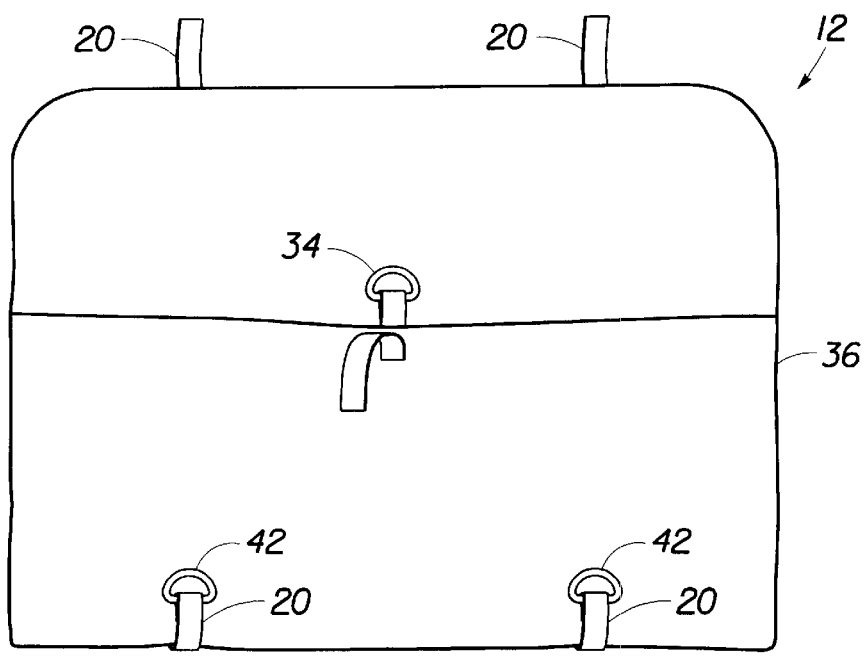
FIGS. 2(A–C) are front views of the compartment of FIG. 1 in open, closed and stowed positions, respectively.
Figure 2B:
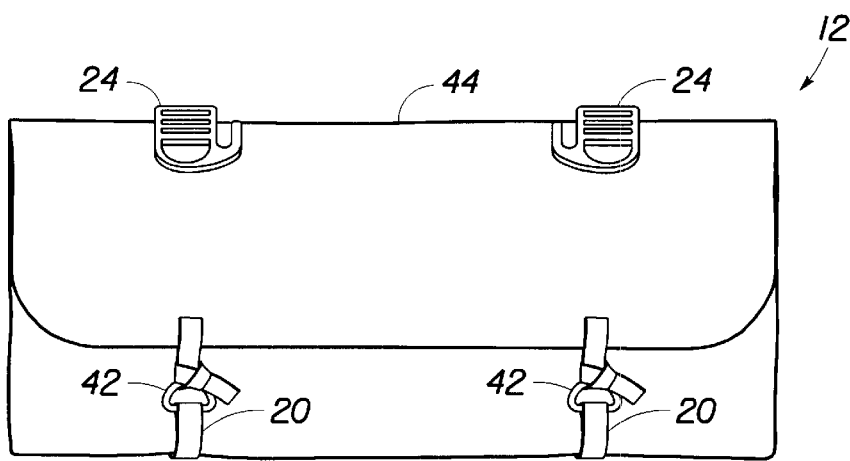
Figure 2C:
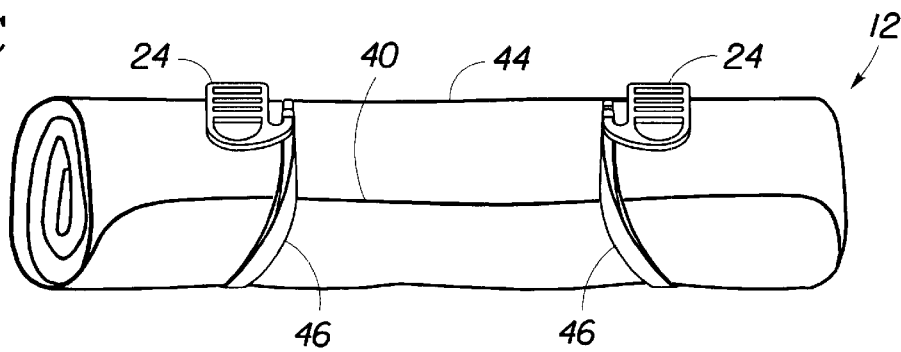

FIGS. 2(A–C) are front views of the compartment 12 of FIG. 1 in open, closed and stowed positions, respectively. From these front views it is possible to see how the pair of heavy straps 20 may be extended around the compartment and sewn thereto. To close the compartment 12, it is preferred to first fasten the buckle 34 (FIG. 2(A)), then lower the flap 44 and fasten the pair of buckles 42 (FIG. 2(B)). With the flap closed, the empty collapsible compartment 12 may be rolled up from the bottom edge. The loop 46 (See FIG. 1) may then be wrapped around the rolled compartment and secured to a hook on the buckle 24 so that the compartment is stowed.

Figure 3A:
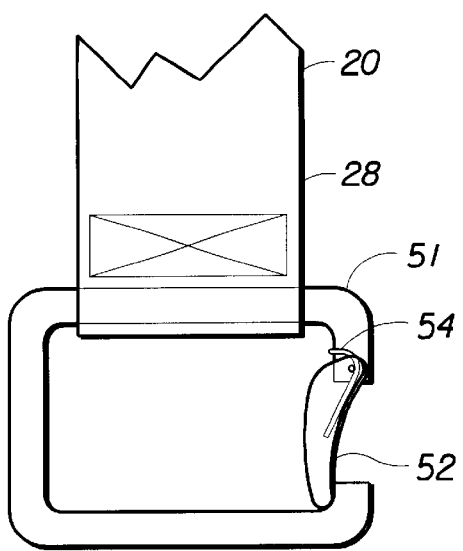
FIGS. 3(A–C) show the second end of the anchor system including a spring clip or buckle.
Figure 3B:
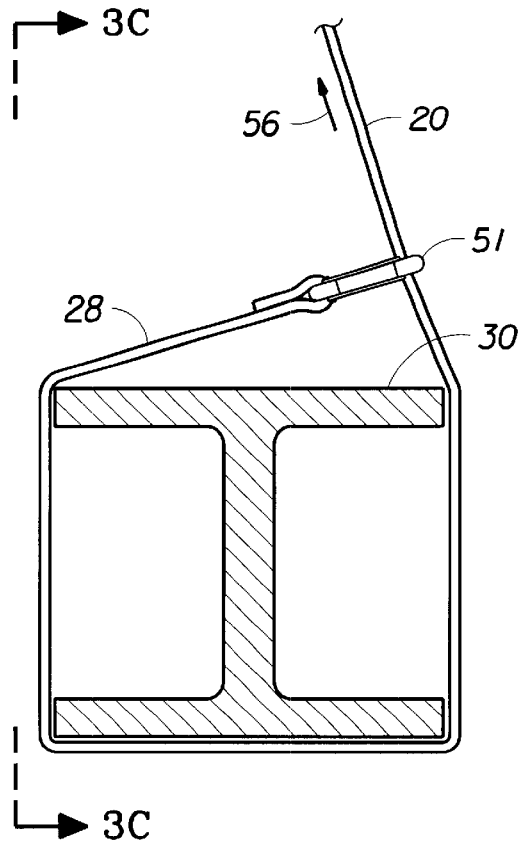
Figure 3C:
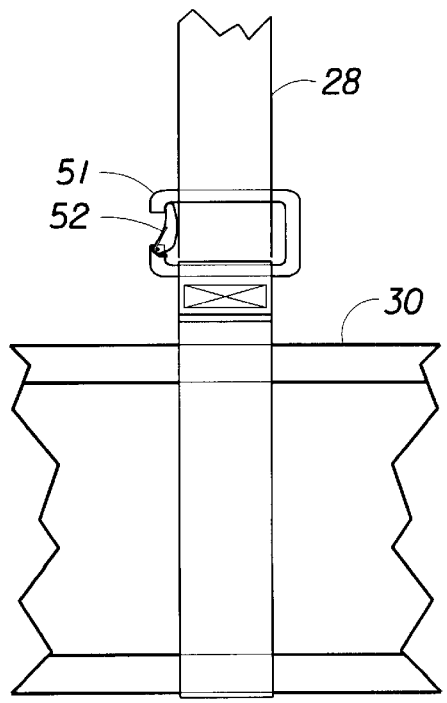

FIGS. 3(A–C) show the second end 28 of the anchor system 14 including a spring clip or buckle 51. The spring clip 51 includes a gate or latch member 52 that is urged towards a closed position by a spring 54. To secure the second end 28 to the truck frame 30, the strap 20 is looped around the truck frame 30 and pushed through the latch 52 of the spring clip 51. The strap is preferably held in sliding engagement with the spring clip 51 so that a simple tug on the strap 20 in the direction of arrow 56 will draw the strap snuggly around the frame or other rigid member 30, regardless of its size.

FIGS. 4(A–B) are external and internal views, respectively, of a pattern for constructing the compartment 12 with two straps 20 in accordance with the invention. The cargo bag, according to this invention, is preferably constructed of a single sheet of a durable, tightly woven fabric, coated so as to be water resistant. The fabric is flexible but inelastic. Heavy stitching on all seams and attachments is necessary for the durability expected of pickup truck accessories. Metal grommets are preferably installed on the straps to prevent fraying and provide added strength.

The anchor system is preferably made with nylon straps about 2 inches wide. It is recommended that the material be a DOT (Department of Transportation) rated product based upon the load the compartment is designed to sustain. The straps 20 preferably serve as both the anchor straps and closing straps.

The structural bar 48 is housed in the sewn pocket 50 along the top of the compartment and is preferably removable. The bar can be any rigid material, including, but not limited to, metal, fiberglass and wood.

An alternative means for attaching the second end 28 of the anchor system is shown in FIGS. 4(A–B) is a pair of grommets 53. To secure this alternative means, the strap 20 is looped around the truck frame (not shown) and a bolt or other fastener is secured through the pair of grommets. It should be noted that the second end 28 may comprise a plurality of grommets 53 to allow flexibility in the size of the loop during installation.

The compartment may be constructed in accordance with the following steps:

1. Sew the nylon straps 20 to the material as identified in FIGS. 4(A–B). Sew the structural bar pocket 50 in the same fashion.

2. Fold the material bringing line "A" to line "C" and sew a seam along each side 55 of the compartment 12.

3. Attach male ends 57 for the buckle 34 to the flap of the compartment along the same line as the anchor straps.

4. Lace the buckle or ring 24 through the anchor straps 20 and sew a portion 60 of the strap in place around the bar 62 (See FIGS. 5(A–B)). Lace the remaining portion of strap 20 through the buckle 24 as identified in FIG. 5B to securely hold the strap at an appropriate length as described above.

5. Attach grommets 53 or spring clips 51 to the second ends 28 of the straps 20. Additional grommets or other measures should be taken to prevent fraying of the strap and provide added strength.

Figure 5A:
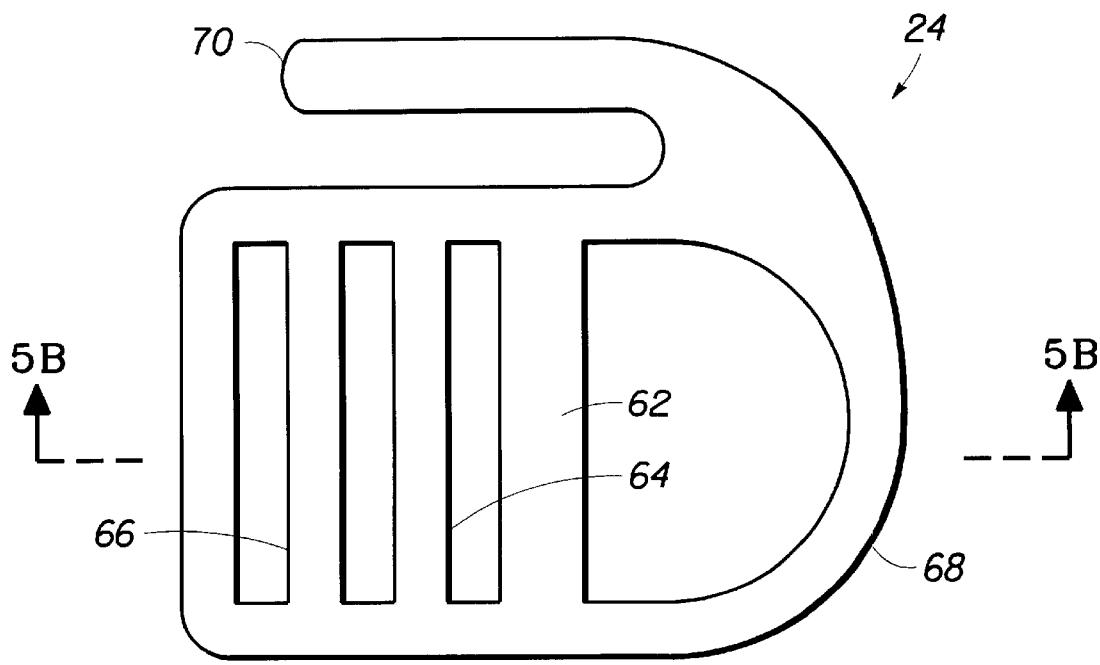
FIGS. 5(A–B) are front and cross-sectional views of a preferred buckle for cooperating with a strap of FIG. 4.
Figure 5B:
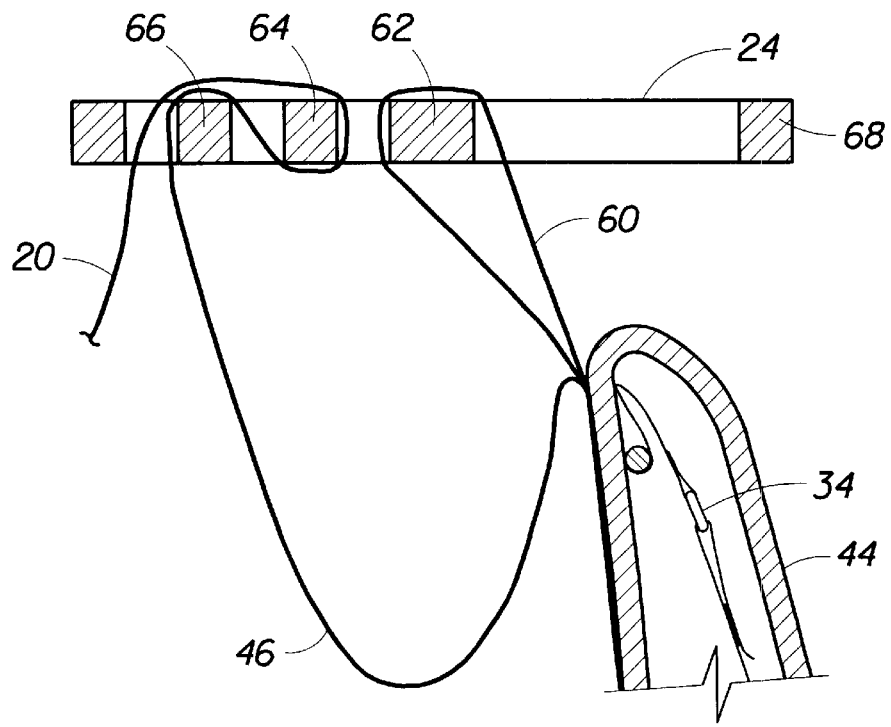

FIG. 5(A) is a face view of a preferred buckle that is rigid, referred to herein as a "D" ring, for cooperating with a strap of FIG. 4. One "D" ring is attached to each of the anchor straps 20. The "D" ring includes a first bar 62 for attachment to the compartment, second and third bars 64, 66 for securing the strap 20 and providing the loop 46 of strap, a fourth bar 68 for tying off various objects or cargo, and hook 70 for securing the loop 46 when the compartment 12 is in the stowed position. FIG. 5(B) is a cross-sectional side view of the buckle of FIG. 5(a) showing a preferred lacing path for a strap(s).

Referring again to FIG. 1, the device of the present invention may be installed on a truck bed in accordance with the following exemplary procedure:

Twist the nylon anchor straps 20 at least 180 degrees, then place the straps over the front wall of the truck bed so they hang down between the truck's bed and the cab of the truck. Avoid wrapping the anchor straps around exhaust components and brake lines located near the truck's frame. Take the loose end 28 of each strap and secure it to the truck frame.

Stand in the truck bed and dress the bag to the desired location on the truck wall by pulling the strap through the "D" ring. Excess strap will hang down behind the compartment to form a loop.

Figure 6:
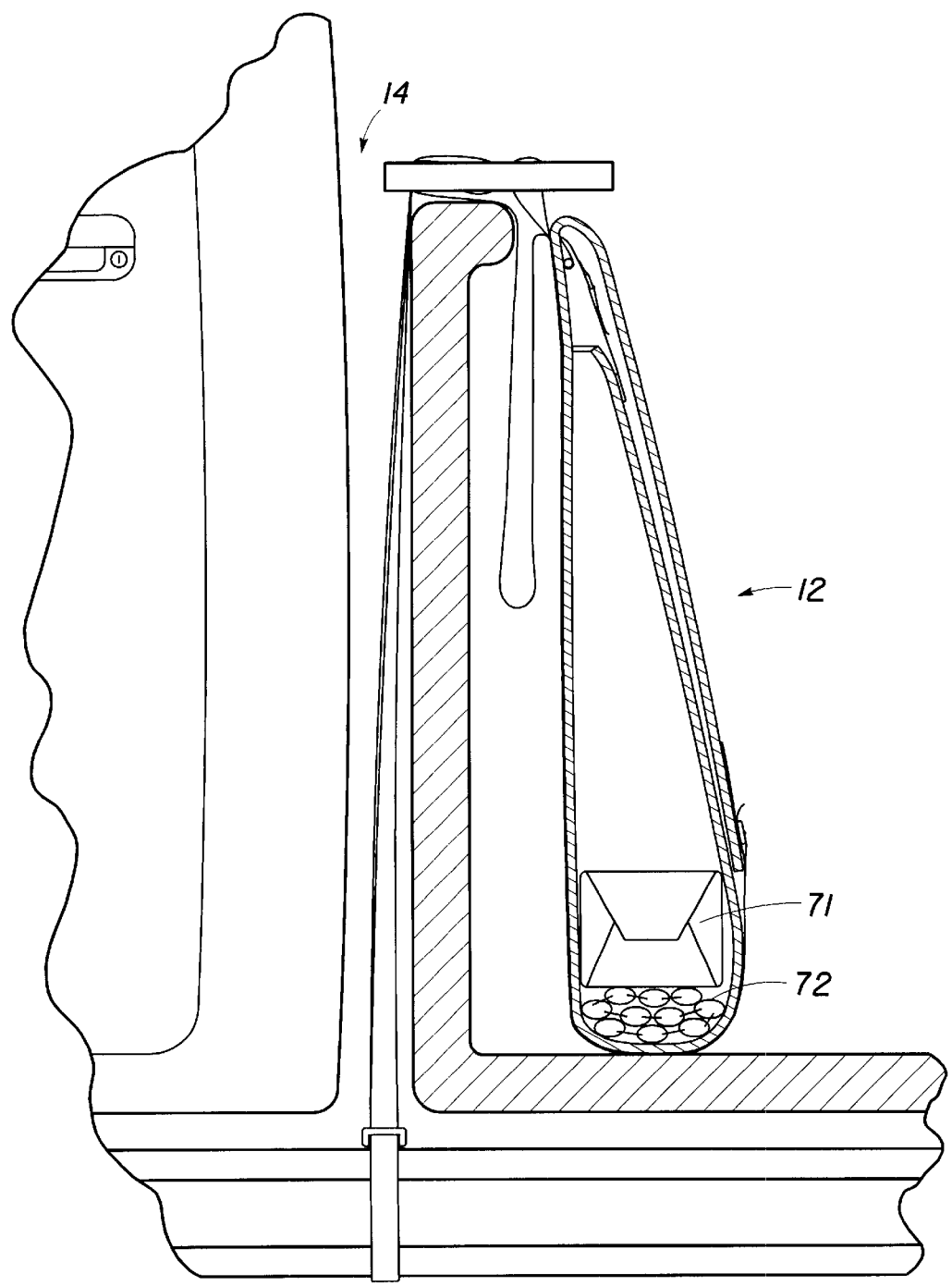
FIG. 6 is a cross-sectional side view as in FIG. 4 with objects secured within the compartment.

FIG. 6 is a cross-sectional side view as in FIG. 1 with objects 71,72 secured within the compartment. The compartment or cargo bag can be closed and locked should the owner wish to discourage unauthorized entry.

Figure 7:
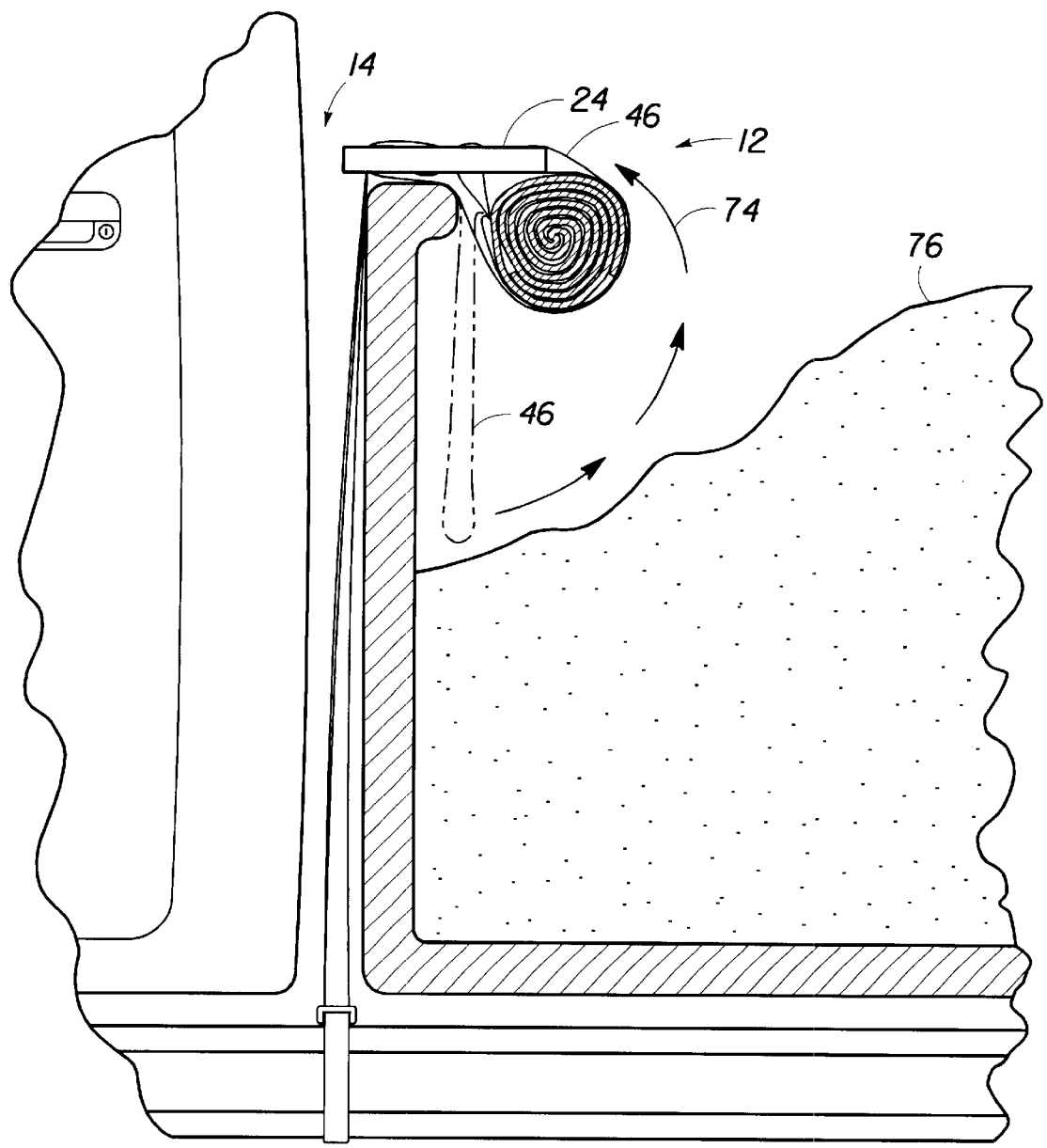
FIG. 7 is a cross-sectional side view of the compartment being stowed with excess strap to be wrapped as indicated.

FIG. 7 is a cross-sectional side view of the compartment 12 being stowed with excess strap or loop 46 to be wrapped as indicated by arrows 74 and coupled to the hook 70 of the "D" ring (See FIG. 5(A). In the stowed position, the compartment does not come into contact with the load 76 being hauled, such as rock, dirt, limbs or the like.

Figure 8:
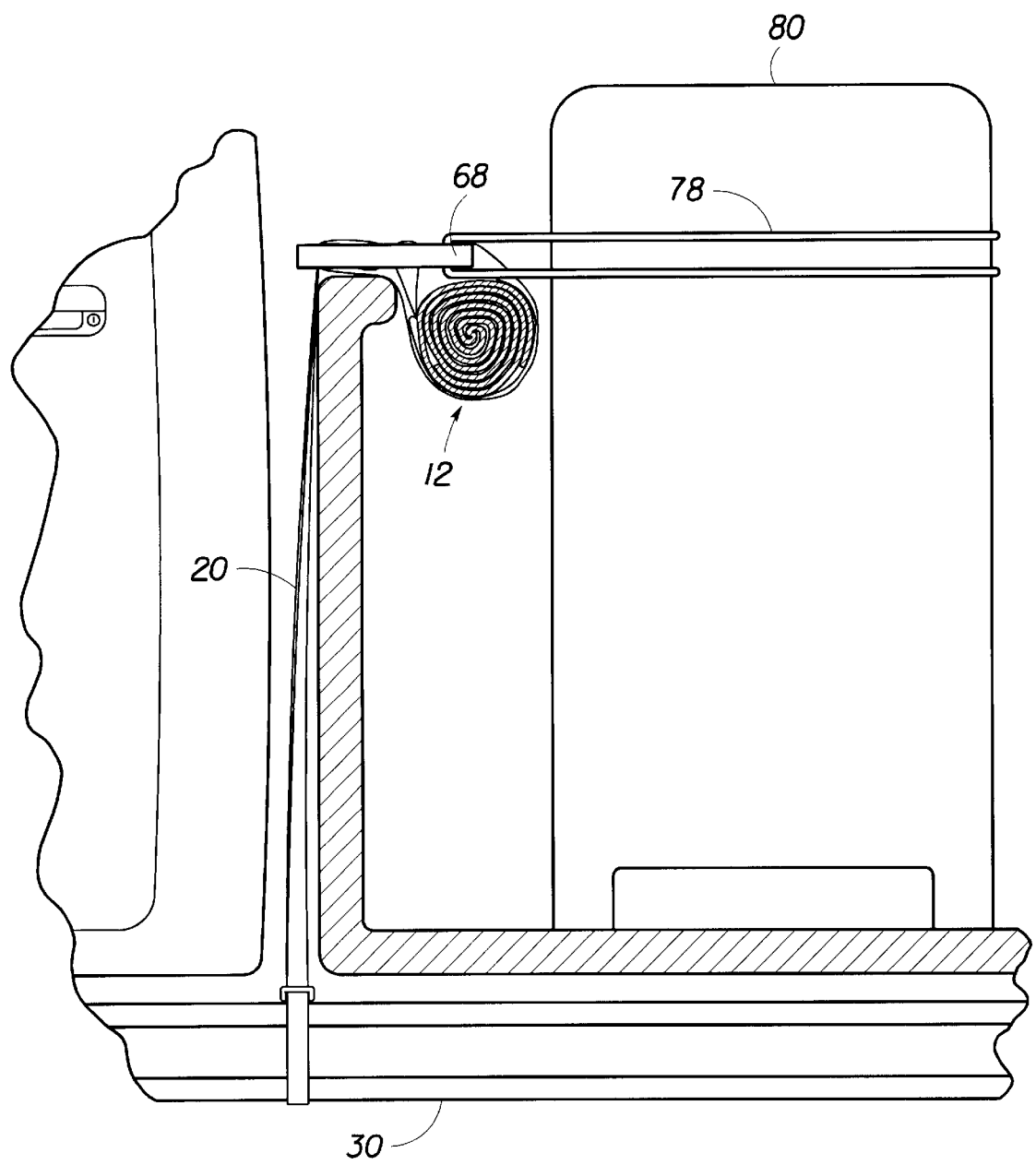
FIG. 8 is a cross-sectional side view of the compartment in a stowed position and a tie down being used to restrain a large object.

FIG. 8 is a cross-sectional side view of the compartment 12 in a stowed position and the tie down bar 68 of the "D" ring being used in conjunction with a rope 78 to restrain a large object 80, such as a dresser, washing machine or the like. Note that forces tending to cause the object to slide, tip or jostle are transmitted through the strap 20 to the truck frame which opposes these forces, thereby securing the object from damage.

Figure 9:
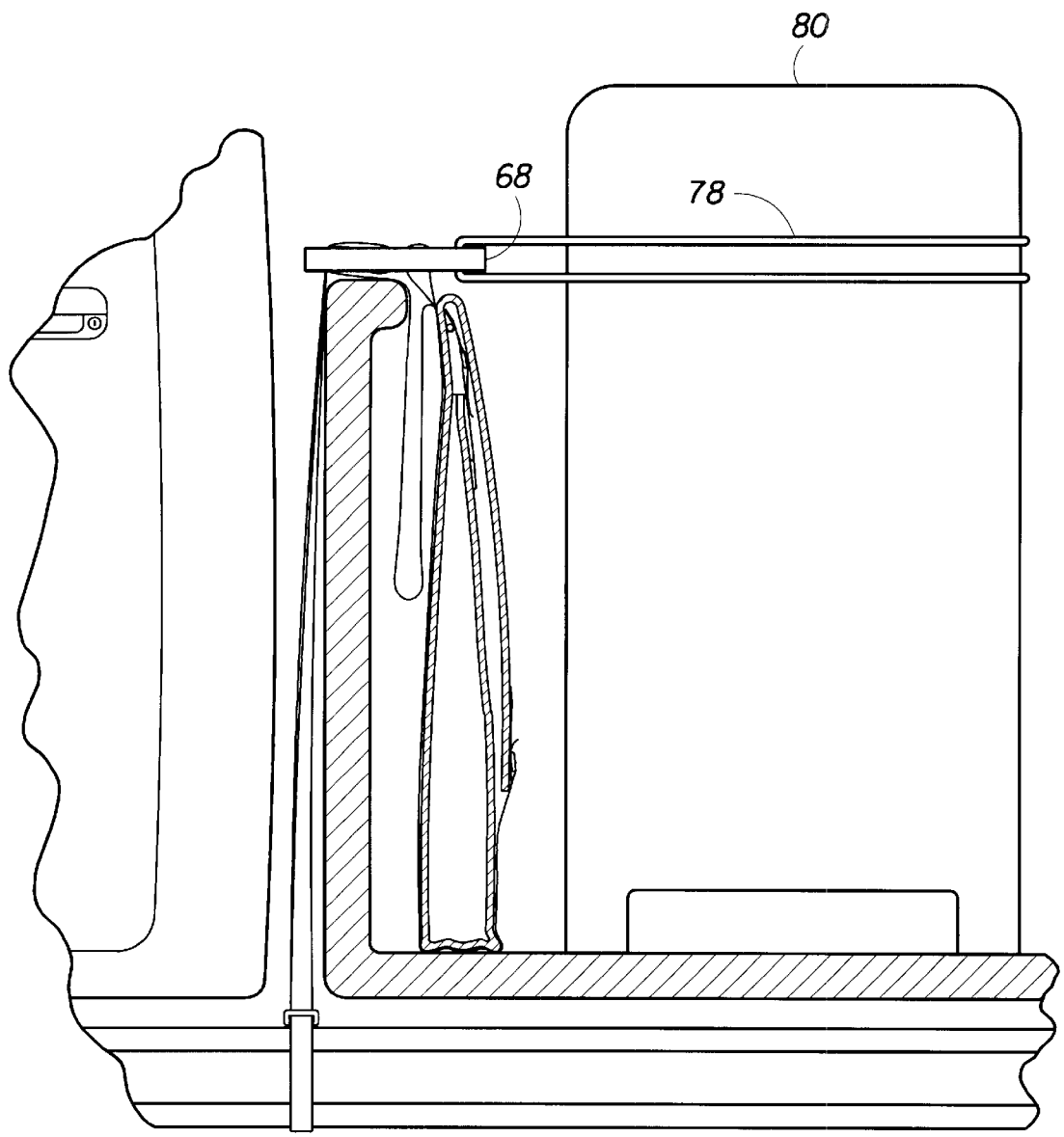
FIG. 9 is a cross-sectional side view of the compartment in a deployed position and a tie down being used to restrain a large object.

Similarly, FIG. 9 is a cross-sectional side view of the compartment 12 in a deployed position and the tie down bar being used in conjunction with a rope to restrain the large object.

While the foregoing is directed to the preferred embodiment of the present invention, other and further embodiments of the invention may be devised without departing from the basic scope thereof, and the scope thereof is determined by the claims which follow.

What is claimed is:

1. A method of securing a compartment to a truck having a cab, a bed and a support frame, comprising:

(a) securing first ends of two or more flexible straps to the compartment;

(b) extending second ends of the two or more flexible straps through a gap between the cab and the bed;

(c) securing the second ends of the two or more flexible straps to the support frame; and (d) taking up slack in the two or more flexible straps between the first and second ends.

2. The method of claim 1, wherein the compartment is formed of a flexible material.

3. The method of claim 1, further comprising:

(e) rolling up the flexible compartment; and (f) wrapping the slack in the two or more flexible straps around the flexible compartment in a roll.

4. The method of claim 1, further comprising:

(e) rolling up the flexible compartment;

(f) wrapping the slack in the two or more flexible straps around the flexible compartment in a roll; and (g) securing the slack around the flexible compartment.

5. The method of claim 4, wherein the slack is secured around the flexible compartment by a buckle.

6. The method of claim 5, wherein the buckle takes up slack in the flexible strap.

* * * * *